(12) United States Patent
Lise et al.

(10) Patent No.: US 8,702,829 B2
(45) Date of Patent: Apr. 22, 2014

(54) FRAMED AIR FILTER WITH OFFSET SLOT, AND METHOD OF MAKING

(75) Inventors: Jonathan M. Lise, Woodbury, MN (US); Dennis M. Glass, Cottage Grove, MN (US); Stephen M. Sanocki, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 54 days.

(21) Appl. No.: 13/490,545

(22) Filed: Jun. 7, 2012

(65) Prior Publication Data

US 2013/0327004 A1    Dec. 12, 2013

(51) Int. Cl.
    *B01D 46/10*      (2006.01)

(52) U.S. Cl.
    USPC ............. 55/495; 55/DIG. 5; 55/DIG. 31

(58) Field of Classification Search
    USPC ............ 55/494, 495, 501, 511, 521, DIG. 31; 229/172, 176, 192
    See application file for complete search history.

(56) References Cited

U.S. PATENT DOCUMENTS

| | | | |
|---|---|---|---|
| 2,723,731 A | 11/1955 | Schaaf | |
| 3,023,839 A | 3/1962 | Best | |
| 3,031,047 A | 4/1962 | Williams | |
| 3,107,990 A | 10/1963 | Getzin | |
| 3,467,257 A | 9/1969 | Getzin | |
| 3,793,692 A | 2/1974 | Tate | |
| 3,830,045 A | 8/1974 | Copenhefer | |
| 3,938,973 A | 2/1976 | Kershaw | |
| 3,970,440 A | 7/1976 | Copenhefer | |
| 4,086,071 A | 4/1978 | Champlin | |
| 4,105,423 A | 8/1978 | Latakas | |
| 4,323,379 A | 4/1982 | Shearin | |
| 4,372,763 A | 2/1983 | Champlin | |
| 4,420,315 A | 12/1983 | Kershaw | |
| 4,464,187 A | 8/1984 | Kershaw | |
| 4,570,844 A | 2/1986 | Wysocki | |
| D283,438 S | 4/1986 | Doyle | |
| 4,636,233 A * | 1/1987 | Lizmore | 55/501 |
| 5,505,852 A | 4/1996 | van Rossen | |
| 5,800,588 A | 9/1998 | Miller | |
| 5,810,898 A * | 9/1998 | Miller | 55/501 |
| 6,033,454 A * | 3/2000 | Hoeffken | 55/494 |
| 6,209,724 B1 | 4/2001 | Miller | |
| 6,656,243 B2 | 12/2003 | Hodge | |
| 6,740,137 B2 | 5/2004 | Kubokawa | |
| 6,758,878 B2 | 7/2004 | Choi | |
| 7,025,797 B2 | 4/2006 | Zettel | |
| 7,112,255 B2 | 9/2006 | Choi | |

(Continued)

FOREIGN PATENT DOCUMENTS

| | | |
|---|---|---|
| JP | 04367703 | 12/1992 |
| JP | 05103931 | 4/1993 |

OTHER PUBLICATIONS

Enstrom, et al., U.S. Appl. No. 29/424,105, Entitled *Air Filter*, filed Jun. 7, 2012.

*Primary Examiner* — Duane Smith
*Assistant Examiner* — Minh-Chau Pham
(74) *Attorney, Agent, or Firm* — Kenneth B. Wood

(57) ABSTRACT

A framed air filter and method of making. The framed air filter includes air filter media and a frame with a frame portion with an upstream flange and a downstream flange and an inner sidewall and an outer sidewall. The inner sidewall includes an open-ended, offset slot.

20 Claims, 4 Drawing Sheets

(56) References Cited

U.S. PATENT DOCUMENTS

| | | |
|---|---|---|
| 7,118,610 B2 | 10/2006 | Lipner |
| 7,261,757 B2 | 8/2007 | Duffy |
| 7,537,630 B2 | 5/2009 | Schuld |
| 7,758,667 B2 | 7/2010 | Ashwood |
| 7,776,123 B2 | 8/2010 | Lawrence |
| 8,021,454 B2 | 9/2011 | Braunecker |
| 2004/0182055 A1 | 9/2004 | Wynn |
| 2007/0204574 A1 | 9/2007 | Workman |
| 2008/0163595 A1* | 7/2008 | Knapp ............................ 55/498 |
| 2009/0183477 A1* | 7/2009 | Workman ...................... 55/495 |
| 2009/0301044 A1* | 12/2009 | Miller et al. .................... 55/475 |

* cited by examiner

FRAMED AIR FILTER WITH OFFSET SLOT, AND METHOD OF MAKING

BACKGROUND

Air filters are commonly used in forced air systems, e.g. residential heating and air-conditioning systems, in order to remove dust and dirt particles and the like.

SUMMARY

Herein is disclosed a framed air filter and method of making. The framed air filter includes air filter media and a frame, of which at least one frame portion comprises an upstream flange and a downstream flange and an outer sidewall and an inner sidewall. The inner sidewall includes an open-ended, offset slot.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Figure 3:
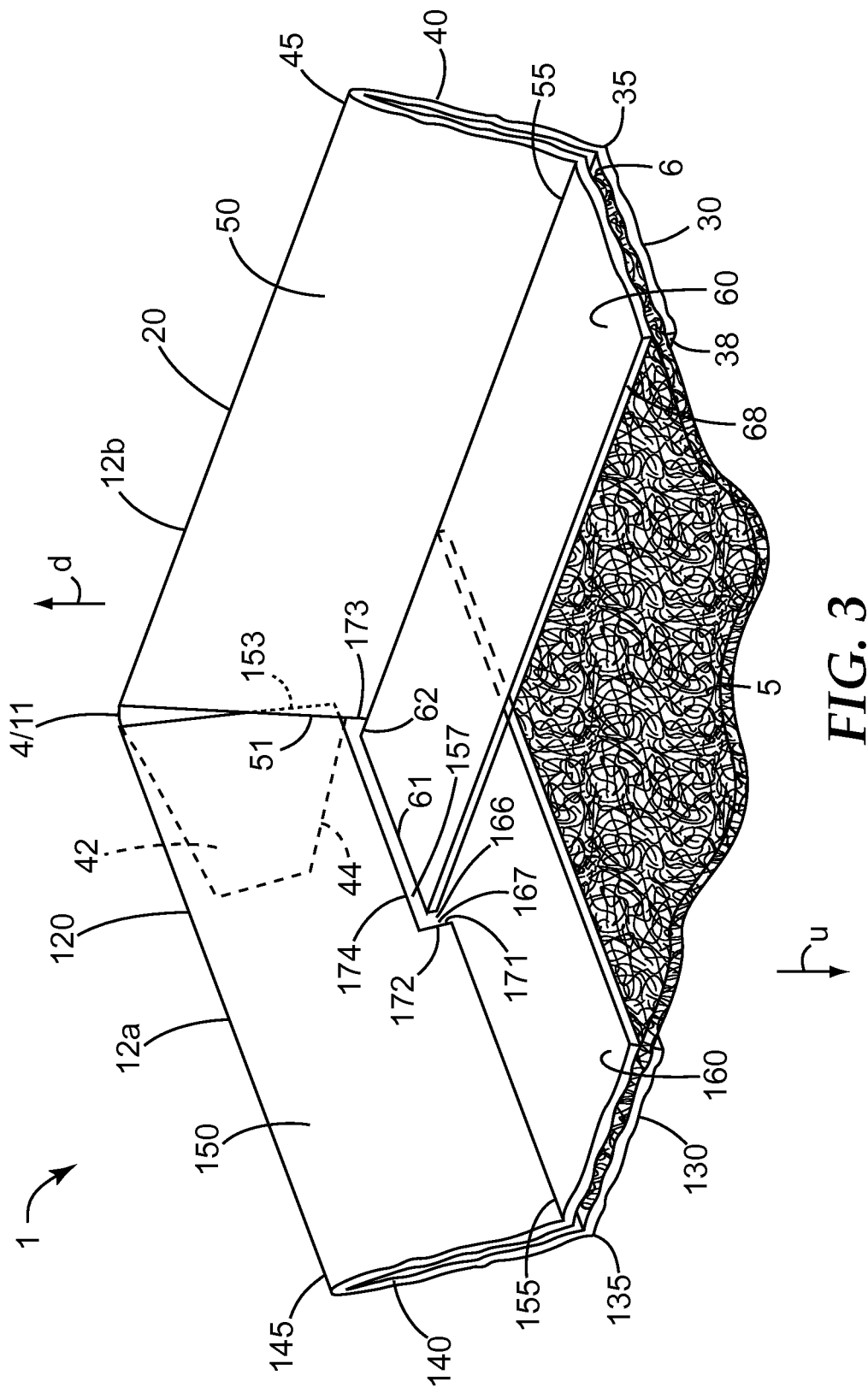
FIG. 3 is a perspective partial cutaway view of a corner portion of the exemplary framed air filter of FIG. 1, viewed from the downstream side of the framed air filter.
Figure 5:
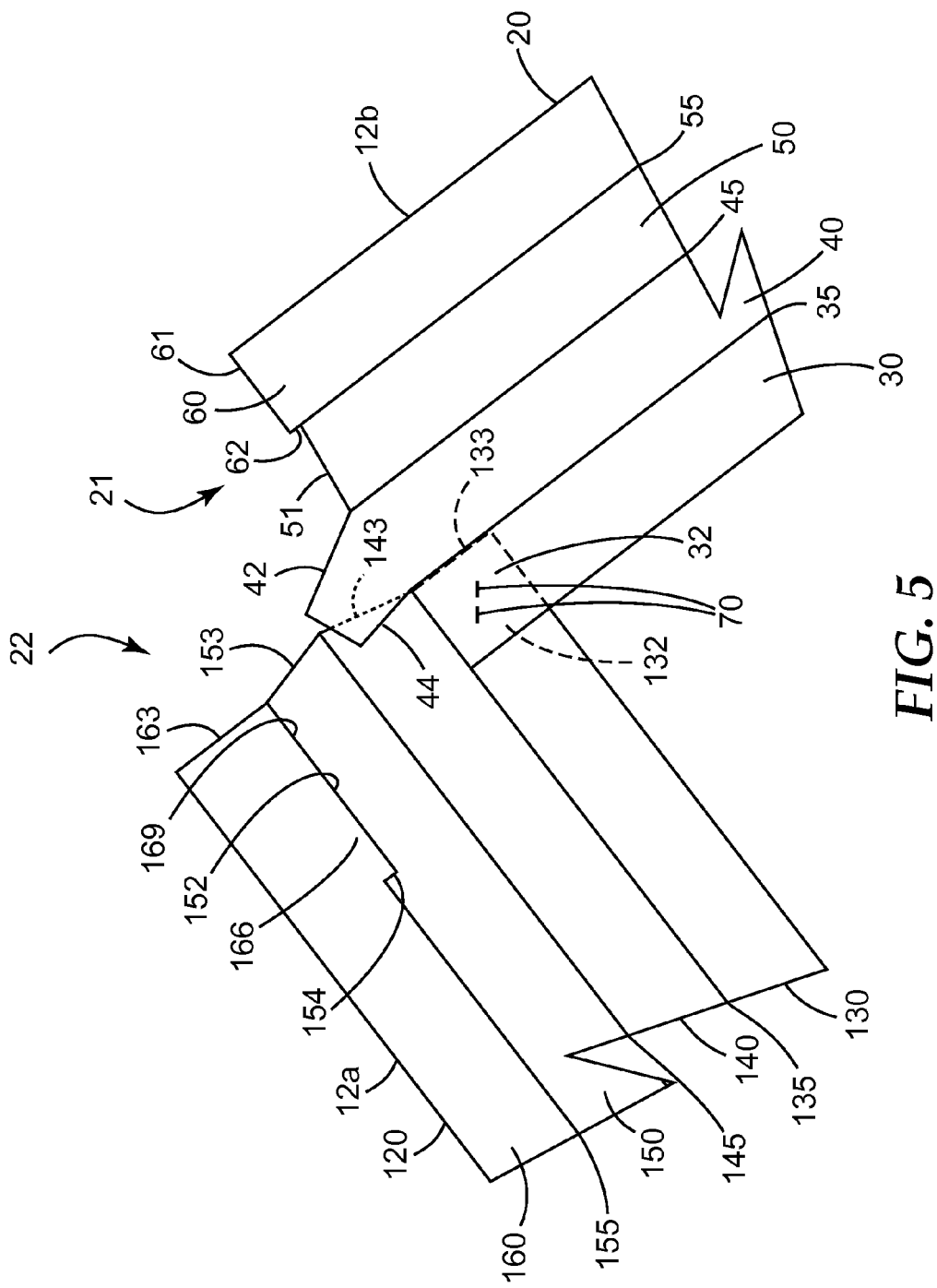
FIG. 5 is a plan view of end sections of two frame pieces, which end sections are connected to each other preparatory to folding the frame pieces so as to form portions of a filter frame.

It is noted that when two frame pieces or portions are shown in detail in FIGS. 3 and 5), two digit numbers are used for components of one frame portion, with the same numbers plus 100 being used for like components of the other frame portion. Thus, not all 1—numbers that appear in such Figures are necessarily referred to individually in the specification, but such numbers are included in the Figures for clarity.

Definitions

Although terms such as "top", bottom", "upper", "lower", "under", "over", "front", "back", "up" and "down", and "first" and "second" may be used in this disclosure, it should be understood that those terms are used in their relative sense only unless otherwise noted. Terms such as "outer", "outward", "outwardmost", "outwardly", and the like, mean in a direction generally away from the geometric center of the air filter media. Terms such as "inner", "inward", "inwardmost", "inwardly", and the like, mean in a direction generally toward the geometric center of the air filter media. The term "overlapping relation" denotes a configuration in which two substrates overlap each other, and permits at least one additional substrate (e.g. a layer of adhesive) to be in between the two overlapping substrates. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match.

Figure 1:
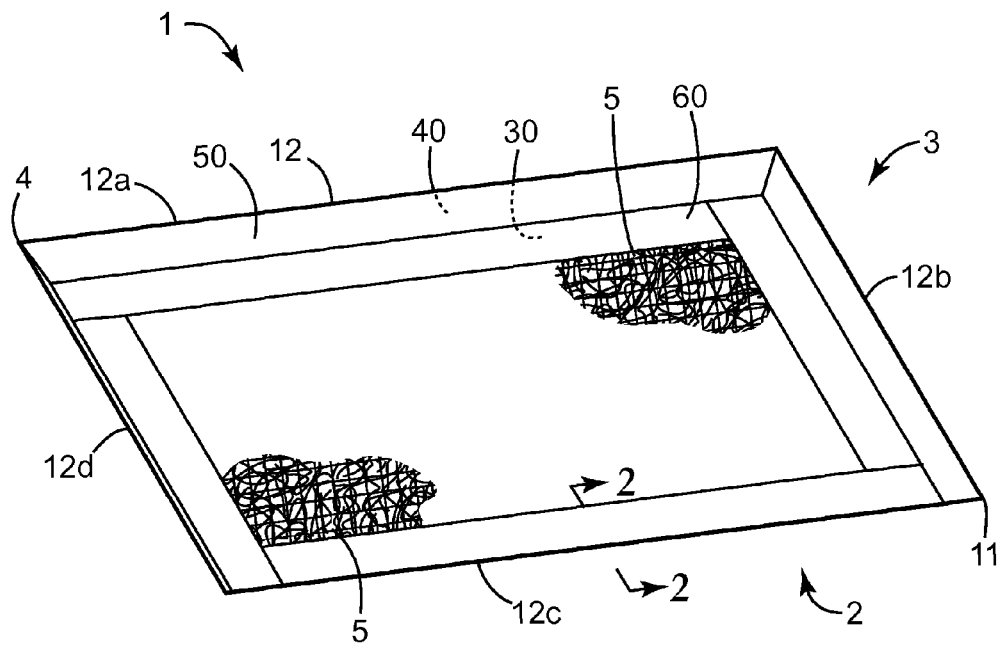
FIG. 1 is a perspective view of an exemplary framed air filter as disclosed herein, viewed from the downstream side of the framed air filter.
Figure 2:
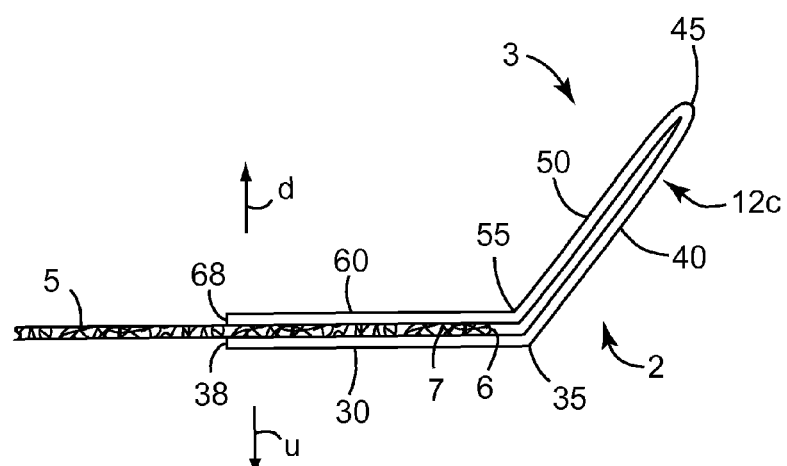
FIG. 2 is a cross-sectional slice view of a portion of the exemplary framed air filter of FIG. 1, taken along line 2-2.

The term "upstream" is used to denote the closed-end side of a framed air filter, corresponding to the far side of filter 1 as shown in FIG. 1 and to the lower side of filter 1 as shown in FIG. 2. The term "downstream" is used to denote the open-ended side of such an air filter (the side to which the filter frame sidewalls protrude), corresponding to the near side (the viewed side) of filter 1 as shown in FIG. 1 and to the upper side of filter 1 as shown in FIG. 2. (Certain figures are marked with "u" and "d" to aid in recognition of upstream and downstream sides of the filter and components.) These terms are used purely for convenience of description herein, in recognition of the observation that such filters are often placed into forced air ventilation systems with the closed-end side of the filter facing the stream of incoming air (i.e., facing upstream) and with the open-ended side of the filter facing downstream (e.g. with the terminal ends of the sidewalls resting against support flanges of the forced air ventilation system). However, it will be appreciated that in some cases such filters might be placed in an airstream in the reverse orientation; thus, it is emphasized that the terms upstream and downstream are used herein merely for convenience of description of various components of the filter and their geometric relationship, irrespective of how such a filter might be eventually installed into a forced air ventilation system.

DETAILED DESCRIPTION

Shown in FIG. 1 in perspective view from the downstream side is an exemplary framed air filter 1 as disclosed herein. Shown in FIG. 2 is a cross-sectional slice view of a portion of the exemplary air filter of FIG. 1, taken along line 2-2 of FIG. 1. Air filter 1 comprises an upstream side 2 and a downstream side 3, as depicted in FIGS. 1 and 2 and as defined and described above. Air filter 1 comprises air filter media 5 and frame 12 mounted generally on, and surrounding, perimeter 6 of filter media 5. Air filter 1 may be rectangular in shape (which specifically includes square shapes) with corners 4, with filter media 5 thus having a generally rectangular perimeter 6 (which does not preclude irregularities, notches, chamfered or angled corners, or the like, in perimeter 6 of filter media 5). Frame 12 may thus take the form of a rectangular frame with four major elongate frame portions that are each mounted on one of the four major edges of the filter media and with neighboring frame portions meeting to form corners 11 of frame 12 as shown in FIG. 1. For convenience in describing such generally rectangular geometry, the four major portions of frame 12 may occasionally be referred to herein by a lettered subscript (e.g., a, b, c, or d). It will be recognized that in a rectangular filter, opposing frame portions (e.g., portions 12a and 12c; and, portions 12b and 12d, as shown in FIG. 1)

may in some cases be identical to each other. In the case of a square filter, all four portions may in some cases be identical to each other.

As shown in FIG. 2, at least one portion of frame 12 comprises a downstream flange 60 and an upstream flange 30, which flanges may be generally parallel to each other and may capture (e.g., pinch) border portion 7 of filter media 5 therebetween. In some embodiments, an inwardmost edge 68 of downstream flange 60 may be aligned (along an inward-outward direction, as shown in FIG. 2) within e.g. about 2 mm, 1 mm, or 0.5 mm, on average, of an inwardmost edge 38 of upstream flange 30.

The frame portion further comprises outer sidewall 40, which extends outward and downstream from flange 30 and is foldably connected thereto by fold line 35; and, inner sidewall 50, which extends outward and downstream from flange 60 and is foldably connected thereto by fold line 55, with outer sidewall 40 and inner sidewall 50 being foldably connected by fold line 45. (In some embodiments, all four filter frame portions may comprise the above-listed upstream and downstream flanges and inner and outer sidewalls and foldable connections therebetween.) In this context, the term foldable signifies that the frame portion is formed (i.e., into the general configuration shown in FIG. 2) by folding the various flanges and sidewalls of the frame portion relative to each other along the various fold lines (as described later herein in detail). The term does not denote that the frame portion (or the entirety of frame 12), once formed, is foldable in the sense that it can be collapsed or folded flat. In fact, as will be made clear herein, in various embodiments frame 12, once formed, may not be collapsible or foldable.

In various embodiments, inner sidewall 50 and outer sidewall 40 may be positioned at an angle to each other (when viewed in cross section as shown in FIG. 2, and as measured from the vertex provided by fold line 45) of less than about 40, 30, 20, or 10 degrees. In further embodiments, inner sidewall 50 and outer sidewall 40 may be generally parallel to each other. In specific embodiments, areas of inner sidewall 50 and outer sidewall 40 may be bonded, e.g. adhesively bonded, to each other.

As mentioned, any two neighboring frame portions of frame 12 meet to form a corner 11 of frame 12. One such corner is shown in detail in perspective view in FIG. 3. In FIG. 3, certain component numbers of frame portion 12a are incremented by 100 from like components in frame portion 12b so as to distinguish components of frame portion 12a from like components those of frame portion 12b.

As disclosed herein, at least one frame portion (portion 12a, in FIG. 3) comprises an inner sidewall (e.g., sidewall 150 of FIG. 3) that comprises an open-ended, offset slot (e.g., slot 157 as shown in FIG. 3). By open-ended is meant that the slot extends from a first, closed end (e.g., denoted by the number 171 in FIG. 3) that is bounded by edge 172 of inner sidewall 150 in which the slot is provided, to a second, open end, (e.g., denoted by the number 173 in FIG. 3) which second, open end is aligned with a minor end/edge (e.g., minor end 153 in FIG. 3) of inner sidewall 150, such that the slot is not bounded at its second, open end by the inner sidewall in which the slot is provided. The designation of open-ended is not changed by the fact that second, open end 173 of slot 157 may be bounded by a component (e.g., inner sidewall 50) of a neighboring frame portion, as shown in FIG. 3. All that is required is that the second end not be bounded by the inner sidewall in which the slot is provided.

By offset is meant that the downstream end of the slot is defined by an edge (denoted by the number 174 in FIG. 3) of inner sidewall 150 of the frame portion, while the upstream end of the slot is defined by a downstream surface of downstream flange 160 of the same frame portion. (Specifically, the upstream end of the slot may be defined by downstream surface 167 of tongue 166 of downstream flange 160, as discussed later in detail.) As will be evident from the discussions later herein, such an open-ended, offset slot in a frame portion can impart significant advantages in the folding and assembling of the frame.

In some embodiments, slot 157 is longer (in a direction generally along the elongate length of the inner sidewall) than it is tall (in a direction generally perpendicular to the elongate length of the of the inner sidewall). Ways in which these dimensions can be controlled are disclosed below.

In some embodiments, when frame 12 is partially assembled as described herein, at least a portion of a minor edge/terminal end 61 of a downstream flange 60 of a second, neighboring frame portion 12b, may be at least partially inserted into (i.e., may at least partially reside within) open-ended, offset slot 157 in the inner sidewall 150 of first frame portion 12a, as shown in exemplary embodiment in FIG. 3. It will be appreciated that the extent of insertion of terminal end 61 into slot 157 during frame assembly may vary somewhat in the actual, production-scale assembly of framed filters 1. In addition, pressing of the frame to form the finished framed filter may in some cases reduce or eliminate the extent to which terminal end 61 remains inserted in slot 157. Even in such case, it will be recognized that such at least partial insertion of a downstream flange of a neighboring frame portion, into such an open-ended, offset slot, during assembly of the frame, may allow the formed corner of the partially assembled frame to be self-stabilizing so that the frame may be more easily held in the partially assembled condition while it is being processed (e.g., pressed to form the finished frame). Here and elsewhere herein, the term partially assembled denotes a condition in which the various frame portions are connected to each other in spots (e.g., with staples as described later herein) and have been folded, but in which the various components of each individual frame portion have not yet been fully bonded (e.g., adhesively bonded) together to attain their final configuration in which the framed filter can be packaged and shipped. Here and elsewhere herein, by self-stabilizing is meant that once a corner is formed, flanges and/or sidewalls of the two frame portions that form the corner may interact with each other (e.g., may physically interfere with any unfolding motion of each other) to minimize the tendency of the various flanges and sidewalls to unfold from a folded configuration.

In further detail, it will be understood that with common frame materials (e.g., paperboard), folded sections may tend to unfold from a folded configuration due to the inherent resilience of the e.g. paperboard. Thus with reference to FIG. 3, in a partially assembled frame, downstream flange 60 and/or inner sidewall 50 of frame portion 12b may exhibit a tendency to unfold from upstream flange 30 and outer sidewall 40. The same may hold true of flange 160 and sidewall 150 of frame portion 12a. The providing of open-ended, offset slot 157 may have the result that, if such unfolding begins to occur, edge 68 of downstream flange 60 (and/or a downstream surface of flange 60) of the frame portion 12b may contact (e.g., become wedged against) edge 174 of inner sidewall 150 of frame portion 12a. (In some instances, this may occur e.g. at or near the corner where edge 174 of inner sidewall 150 meets edge 172 of inner sidewall 150.) In such cases, the interference of flange 60 with inner sidewall 150 may resist the tendency of inner sidewall 150 (and flange 160) to unfold further; and, the interference of inner sidewall 150 with flange 60 may resist the tendency of flange 60 (and inner sidewall 50) to unfold further. In such exemplary manner the corner of the partially assembled frame may be self-stabilizing.

In further embodiments, fold line 55 that foldably connects downstream flange 60 of second frame portion 12b to inner sidewall 50 of second frame portion 12b, may comprise an offset junction 62 between minor edge 61 of downstream flange 60 and minor edge 51 of inner sidewall 50, as shown in FIG. 3. (Offset junction 62 can also be seen in FIG. 4, and will be discussed in further detail later herein in reference to FIG. 4). It will be appreciated that the combination of an open-ended, offset slot (e.g., 157) in a first frame portion, with an offset junction (e.g., 62) in a second, neighboring frame portion which is interfaced with the first frame portion to form a corner of the frame, can impart further advantages in the assembling of the frame. Specifically, such arrangements may minimize any interference between the inner sidewalls 50 and 150 of the two neighboring frame portions during folding of the frame portions, and/or may enhance the self-stabilizing nature of the formed corner of the partially assembled frame 12.

In some particular further embodiments, at least an upstream end of a minor terminal edge of an inner sidewall of one frame portion may be outwardly tucked behind a minor terminal edge of an inner sidewall of second, neighboring frame portion, in the partially assembled frame. By outwardly tucked is meant that at least a portion of the tucking minor terminal edge is present inwardly of, and overlaps, the tucked minor terminal edge so as to minimize the degree to which the tucked minor terminal edge, and adjacent portions of the inner sidewall to which it belongs, may deflect (e.g., unfold) inwardly. Such an arrangement may still further enhance the self-stabilizing nature of the formed corner. In the specific embodiment shown in FIG. 3, minor edge 153 of (slot-containing) inner sidewall 150 is outwardly tucked behind minor edge 51 of (offset junction-containing) inner sidewall 50. However, in other embodiments, a minor edge of an offset junction-containing inner sidewall may be tucked behind a minor edge of a slot-containing inner sidewall. In fact, in the latter case the presence of the offset junction in the tucking edge/sidewall may provide a corner in which the minor edge of the tucked edge/sidewall may be caught so as to enhance the tucking.

It should be noted that such tucking is not necessarily required, and that in large-scale production of filters 1, such tucking may or may not occur, and the role of tucking and tucked sidewalls may swap. Furthermore, in some cases such tucking may disappear upon the partially assembled filter frame being placed into a press and bonded to assume its final state (it will be appreciated that when the frame portions become bonded to their final configuration, the role of such tucking (and indeed, the above-described role of the open-ended offset slot) in stabilizing the partially assembled frame may become largely moot).

In some embodiments, at least one frame portion may optionally comprise a tab that integrally extends from a minor end of an outer sidewall of that frame portion and is connected thereto by a fold line. Such a tab may, when the frame is assembled, extend in between the inner and outer sidewalls of a neighboring frame portion (and may be captured therebetween, e.g. may be bonded to one or both sidewalls). In the specific embodiment shown in FIG. 3, tab 42 integrally extends from outer sidewall 40 of second frame portion 12b (and is connected thereto by a fold line), and extends into a space between inner and outer sidewalls 150 and 140 of first frame portion 12a. Thus, in the specific embodiment depicted in FIG. 3, the tab is provided on the second frame portion 12b (which is frame portion also comprises offset junction 62), while the open-ended, offset slot is provided on the first frame portion 12a. It will be appreciated however than in various embodiments such a tab might be provided on a first frame portion (that is, a frame portion end comprising an open-ended, offset junction and a tab, might be interfaced with a frame portion end comprising an offset junction, to form a frame corner). Tab 42 may further enhance the stability of frame 12 while frame 12 is partially assembled, and may also reduce air leaks at corners 4 frame 12. Instead of, or as an adjunct to, tab 42, strips of adhesive-backed tape or the like may be applied to the corners of the frame to serve such function.

Figure 4:
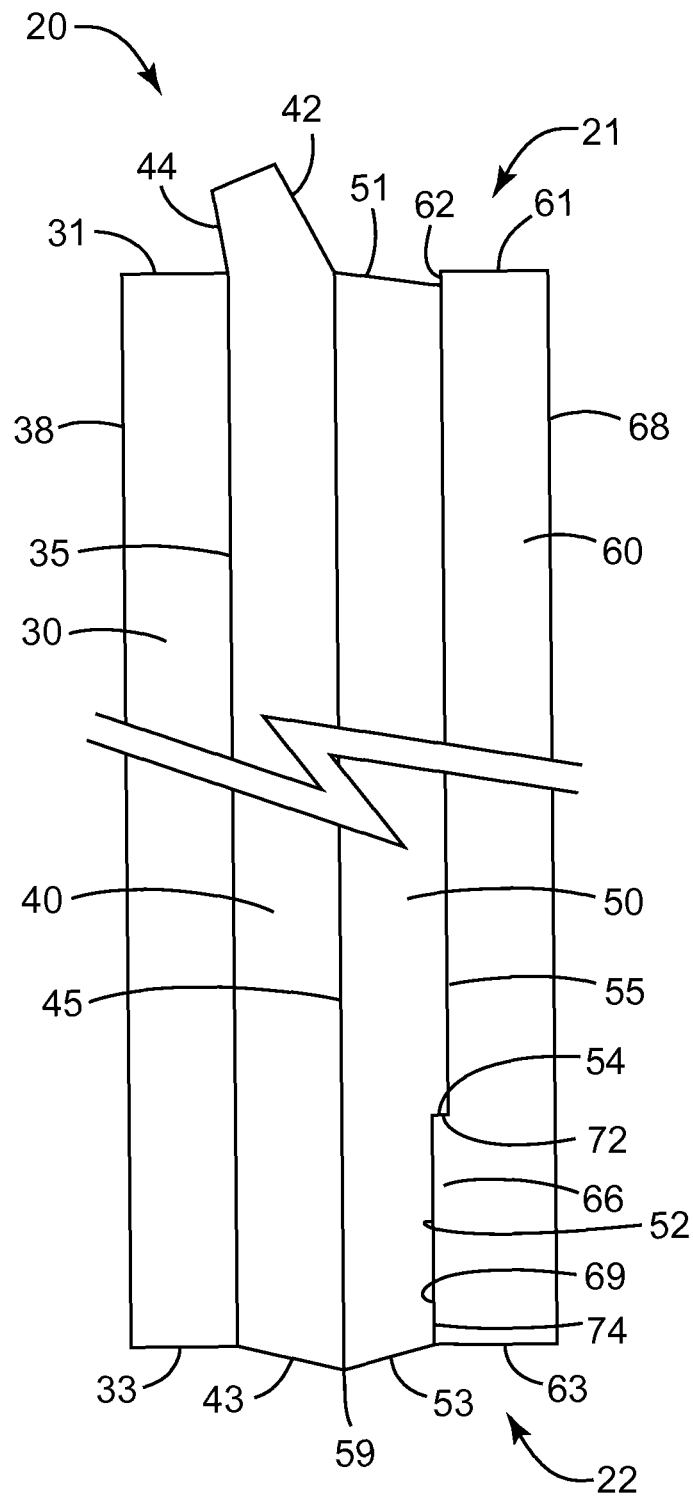
FIG. 4 is a plan view of an exemplary frame piece that may be folded and assembled with other frame pieces to as to form a filter frame, as disclosed herein.

In some embodiments, portions of frame 12 (e.g., four frame portions 12a, 12b, 12c, and 12d) may take the form of four individual, separately made frame pieces that are assembled with each other, and folded, to form frame 12. One such exemplary frame piece 20 is shown in FIG. 4. Frame piece 20 comprises an elongate length with first end 21 and second end 22, and comprises four elongate sections 30, 40, 50 and 60. These elongate sections may respectively comprise second minor ends/edges 33, 43, 53, and 63, at second end 22 of frame piece 20 (at which second end offset slot 57 is provided in the at least partially assembled frame). Minor edges 43 and 53 may be angled to as to meet at protrusion 59 as discussed later herein. Elongate sections 30, 50, and 60, at first end 21 of frame piece 20, may further respectively comprise first minor ends/edges 31, 51, and 61 (in the exemplary embodiment of FIG. 4, tab 42 protrudes from the first end of elongate section 40 thus no corresponding minor end/edge is denoted at this end of section 40).

It will be recognized that, upon folding of frame piece 20, sections 30, 40, 50 and 60 will respectively form the aforementioned upstream flange, outer sidewall, inner sidewall, and downstream flange, of a frame portion. As such, these sections of the frame piece will be referred to by their aforementioned names (and reference numbers) for convenience, with the understanding that the sections will not actually become the named components until the frame piece is folded and e.g. at least partially assembled.

The elongate length of frame piece 20 and of individual sections thereof may be chosen so that a framed filter of a standard size (e.g., nominal 20"×20", 20"×25", etc.) may be assembled therefrom. The width of frame piece 20 and of individual sections thereof may be chosen as desired. It may be convenient to choose the widths of the various sections in view of the folded configuration to be formed. In particular embodiments, the width of downstream flange 60 may be about 85-95% of the width of upstream flange 30, on average, and the width of inner sidewall 50 may be about 85-95% of the width of outer sidewall 40, on average. Such arrangements may provide e.g. that when frame piece 20 is folded to form a frame portion, the inwardmost edges 38 and 68 of upstream and downstream flanges 30 and 60, are aligned as discussed earlier herein and as depicted in FIG. 2.

Frame piece 20 comprises fold lines 35, 45, and 55, which respectively foldably connect upstream flange 30 to outer sidewall 40, outer sidewall 40 to inner sidewall 50, and inner sidewall 50 to downstream flange 60. Such fold lines may be provided by any known method, e.g. by scoring, partially perforating, or using any other suitable method to provide a path along which a fold may preferentially form along frame piece 20. Frame piece 20 may be made of any suitable material, e.g. paperboard, plastic, metal and so on, into which may be imparted fold lines as described herein. In particular embodiments, frame piece 20 may be made of paperboard of thickness in the range of 20-30 thousandths of an inch. In specific embodiments, frame piece 20 is single-layer paperboard rather than corrugated paperboard.

From inspection of FIG. 4 it will now be appreciated how an open-ended, offset slot (e.g., slot 157 of FIG. 3) may be achieved. With reference to FIG. 4, in inner sidewall 50 of frame piece 20 may be provided a multisegment slit. This multisegment slit comprises a first, long segment 52 that extends from minor edge 53 of inner sidewall 50, in a first direction generally parallel to fold line 55 that foldably connects inner sidewall 50 to downstream flange 60. The slit comprises a second segment 54 that is shorter than the first segment, the second segment 54 extending from the end of first segment 52 to fold line 55, along a second direction that is oriented away from the first direction by at least about 50 degrees. (In the depicted embodiment in FIG. 4, the multisegment slit is L-shaped with the angle between the slit segments thus being about 90 degrees). From FIG. 4 it will be noted that fold line 55 terminates proximate second slit segment 52 rather than extending further toward minor edge 53 of inner sidewall 50. It will also be noted that such an arrangement provides a tongue 66, which comprises a long edge 69 defined by slit segment 52 and a short edge defined by slit segment 54. Across slit segment 52 from edge 69 of tongue 66 will be edge 74 of inner sidewall 50. Similarly, across slot segment 54 from tongue 66 will be edge 72 of inner sidewall 50.

It will be appreciated that upon folding frame piece 20 along fold line 55, there may be little or no tendency for tongue 66 to fold along with inner sidewall 50. Rather, tongue 66 will tend to break away (along slit segments 52 and 54) from the other portions of inner sidewall 50. Thus, tongue 66 may tend to stay generally coplanar with downstream flange 60 to which it is connected (noting that in some embodiments no fold line connects tongue 66 to downstream flange 60). It will now be appreciated that the folding (along fold line 55) of a frame piece that comprises such a multisegment slit, can provide an open-ended, offset slot (e.g., slot 157) as disclosed earlier herein.

Slits 52 and 54 may be continuous in a frame piece 20 as received; or, one or both may be discontinuous (for example, provided by way of a line of weakness provided by e.g. a line of perforations). Similarly, slits segments 52 and 54 may or may not be contiguous with each other. All that is necessary is that any connections along the line of weakness should be sufficiently weak that slits 52 and 54 allow tongue 66 to break away from other portions of inner sidewall 50 as described above.

It will be appreciated that in some embodiments such a multisegment slit can be a weedless slit (that is, with no material being caused to be removed from inner sidewall 50 of frame piece 20 by the act of forming the multisegment slit). Nevertheless, folding frame piece 20 e.g. into the configuration of frame portion 12a as shown in FIG. 3, can result in the formation of a relatively large and easily accessible open-ended, offset slot 157 which may e.g. receive a terminal end 61 of a flange of a neighboring frame portion at least during frame assembly and thus may help stabilize a partially assembled frame. The value of providing such an open-ended, offset slot, by way of a multisegment slit (e.g., a weedless slit which results in the formation of the slot only upon folding of the frame piece), may now be fully appreciated.

Further features and attributes of frame pieces as disclosed herein may be illustrated with respect to FIG. 5, which show an exemplary first frame piece 12a, and an exemplary second frame piece 12b, connected to each other and ready to be folded and assembled. (The term connect is used to denote that this initial connecting of frame pieces to each other typically serves merely to hold the pieces in a desired position relative to each other in order to fold the pieces and perform the final attachment of the pieces to each other; the connecting process typically will not impart frame pieces with the strength and rigidity desired of the final frame). To perform such a connection, first end 21 of second frame piece 12b may be placed so that area 32 of upstream flange 30 of second frame piece 12b, is in overlapping relation with area 132 of upstream flange 130 of first frame piece 12a. Any suitable means may be used to connect areas 32 and 132 to each other (a staple 70 is shown in FIG. 5, although e.g. a spot of adhesive or any other connecting mechanism may be used). Frame piece 120 may then be folded in half inwardly along central fold line 145, so that sections 150 and 160 of piece 120, come up out-of-plane of FIG. 5. This will cause sections 150 and 160 to be respectively brought into overlapping relation with sections 140 and 130 and will cause fold lines 135 and 155 to be generally aligned with each other. The half-folded frame piece 120 may then be folded again, along fold lines 135 and 155, so that sidewalls 140 and 150 are brought up, out of plane, into a configuration similar to that shown in FIG. 3. This folding process will open slot 157 as described previously. Frame piece 20 can similarly be half-folded, and then folded again as described above for frame piece 120. The result that a partially assembled frame is formed, with a corner in which downstream flange 60 of frame piece 20/frame portion 12b lies atop (i.e., downstream of) downstream flange 160 of frame piece 120/frame portion 12a so that terminal end 61 of flange 60 extends at least partially into slot 157 of frame piece 12a, in generally similar manner to the configuration shown in FIG. 3. In so doing, end 61 of flange 60 may be caught under upstream edge 174 of sidewall 150 (which edge defines the downstream edge of slot 157), which may minimize the tendency of flange 60 to unfold from its folded position. Likewise, the presence of flange 60 may minimize the tendency of flange 160 and/or inner sidewall 150 to unfold from their folded position. Thus may be provided the aforementioned self-stabilizing property of the formed corner. And, in at least some embodiments, at least an upstream end of a minor terminal edge of an inner sidewall of one of the frame pieces may be outwardly tucked behind a minor terminal edge of an inner sidewall of the other, neighboring frame piece, as shown in FIG. 3 and as mentioned previously.

In summary, the above-described features and designs can provide that components of two neighboring frame pieces/portions may interact with each other in a self-stabilizing manner so as to collectively reduce the tendency of the such components to unfold from their folded condition. A thus-formed corner 11 of frame 12 may thus be self-stabilizing, while frame 12 is in a partially assembled condition. (For ease of description of the frame components and features, the filter media 5 was omitted from the above description and is addressed later herein).

As mentioned, in some embodiments, fold line 55 that foldably connects downstream flange 60 of second frame piece 12b to inner sidewall 50 of second frame piece 12b, may comprise an offset junction 62 between minor edge 61 of the downstream flange and minor edge 51 of inner sidewall 50, as described previously and as seen (in unassembled frame pieces) in FIGS. 4 and 5 and as seen (in a corner of an assembled frame) in FIG. 3. In specific embodiments, minor edge 51 of inner sidewall 50 may be angled away from minor edge 61 of downstream flange 60 at a nominal angle of about 10 to about 25 degrees. (The designation of a nominal angle is used in view of the fact that such an angle is most appropriately measured with flange 60 and sidewall 50 in a coplanar configuration (as shown in FIG. 4) rather than in the assembled frame of FIG. 3.) Such an angle between the two minor edges may further enhance the aforementioned advantages provided by offset junction 62 and may still further enhance the self-stabilizing nature of a corner formed by the interfacing of two such frame pieces.

In some embodiments, a frame piece 20 may comprise an optional tab 42 that may protrude e.g. from outer sidewall 40 as described previously. In specific embodiments, a minor upstream edge 44 of tab 42 may be oriented at a nominal angle that is about 10-25 degrees away from fold line 35 that foldably connects upstream flange 30 to outer sidewall 40 (such a relationship is most easily seen in FIG. 4). As can be seen in FIG. 3, such an angle may, when two frame pieces are interfaced as described above, minimize the extent to which an upstream section of tab 42 might interfere with the ability of tongue 166 portion to remain generally coplanar with downstream flange 160 during the aforementioned folding.

In some embodiments (seen in exemplary design in FIG. 4), an inner sidewall 50 may comprise angled terminal ends/edges 51 and 53, and an outer sidewall 40 may likewise comprise angled terminal ends/edges (noting that in some embodiments one or both such angled ends may comprise a tab protruding therefrom). Such angled ends may meet at a protrusion as exemplified by feature 59 of FIG. 4. Such a design may ensure that if the sidewalls of the formed frame are flared outward as in FIGS. 1 and 4 (e.g., so that the filter is nestable), the sidewalls of neighboring pieces are able to meet at the corners without an unacceptable gap therebetween. The angle of such terminal ends may of course be varied as desired in view of the specific amount of flare that is desired.

With respect to FIGS. 3 and 5, further details of an exemplary process of assembling filters 1 may be described. Four frame pieces may be placed into a fixture with ends of each neighboring set of frame pieces in overlapping relation as in FIG. 5, and may be connected to each other as described above. A suitable bonding adhesive may be deposited on the downstream face of upstream flange 30 (and onto a tab if present) of each frame piece. Filter media (along with any other air-permeable support layer if desired) may then be placed into the fixture, with a bondable border area of the filter media in overlapping relation with at least a portion of the upstream flange of each frame piece. While the exemplary illustration of FIG. 2 shows the perimeter 6 of the filter media 5 terminating at a particular point between the upstream and downstream flanges, any suitable design can be used. For example, the edge of the filter media may extend into the space between the inner and outer sidewalls if desired. Additional bonding adhesive may be deposited atop the downstream face of the bonding filter media; or (depending e.g. on the viscosity of the adhesive and the porosity and wicking characteristics of the filter media), some of the previously-applied bonding adhesive may penetrate through the filter media and minimize or eliminate the need to apply additional adhesive. Each frame piece may then be folded as described above. If desired, some or all of the frame pieces may be pre-folded prior to being inserted in the fixture and/or prior to application of an adhesive; that is, they may be temporarily folded along one or more fold lines, to make it easier to perform the folding when the frame piece is positioned in the fixture. And, once the ends of neighboring pieces are connected to each other, if desired the connected frame pieces may be removed from the fixture to perform the folding.

At each corner, a tab (if present) of one frame piece may be tucked between the inner and outer sidewalls of the neighboring frame piece, during the folding process. The partially-assembled frame, stabilized in this configuration by the various components and features described herein, may then be taken to a press in which pressure, accompanied by heat if desired, can be used to solidify the adhesive.

In some cases a gap (e.g. in the range of 0.1-2 mm) may exist between the inner and outer sidewalls of one or more frame portions, at least while the frame is in its partially assembled state. In fact, the existence of such a gap during assembly of the frame may aid in the ease of inserting the aforementioned tongue at least partially into the aforementioned open-ended, offset slot. Such a gap may also aid in the ease of inserting an aforementioned optional tab in between the inner and outer sidewalls. Such gap may however partially, or substantially, or completely disappear in the process of pressing the frame and solidifying the adhesive. Indeed, in some cases it may be desirable that little or no gap is present between the inner and outer sidewalls of the finished frame. Thus, if desired, bonding adhesive can be provided in the space between the inner and outer sidewalls of one or more frame pieces, such that when the adhesive is solidified the inner and outer sidewalls are substantially adhered to each other. In an extension of such an approach, bonding adhesive can be applied to an entire surface of one, some or all frame pieces (e.g., the entire visible surface of frame piece 20 of FIG. 4), e.g. by a roll coater or the like. Such an approach may enhance the degree to which the sidewalls are bonded to each other, the degree to which the flanges are bonded to each other and/or to the filter media, and so on. It will be appreciated that if such a gap between the inner and outer sidewalls is substantially eliminated during the process of pressing the frame and solidifying the adhesive, the outwardmost section of an aforementioned tongue (i.e., edge 69 and sections proximate thereto, of exemplary tongue 66 as shown in FIG. 4) may be contacted by the inward-facing surface of the outer sidewall (or, in some locations, it may be contacted by the inward-facing surface of a tab). In such circumstances, at least this outwardmost section of the tongue might deform (bend) slightly (e.g., toward the downstream side of filter 1). Such contact and/or deformation will be of no consequence as long as the tongue does not unacceptably prevent the desired degree of minimizing or eliminating of the inner-outer sidewall gap.

In various embodiments, in the finished filter the inner sidewall of each frame portion may be oriented at a nominal angle of about 90 degrees to about 140 degrees, relative to the downstream flange of that frame portion. (For example, in the exemplary embodiment of FIG. 2, inner sidewall 50 is oriented approximately 130 degrees from downstream flange 60.) The designation nominal is used in recognition of the fact that in large scale production of filters 1, some variation in this angle may occur along the elongate length of a particular frame portion. Often, the outer sidewall of each frame portion may form a generally similar angle with the upstream flange of that frame portion.

In specific embodiments in which the sidewall angle is nominally 90 degrees, filter 1 may not be nestable. In other embodiments, in which the sidewall angle is greater than 90 degrees (e.g., is greater than about 110 degrees), filter 1 may be nestable. By nestable is meant that multiple filters 1 (of the same shape and size), can be stacked so that they collectively occupy less than 70% of the total height obtained by multiplying the height of each filter by the number of filters. For purposes of such calculation, the height of a filter is the distance, along an axis normal to the major plane of the filter, from the farthest downstream point of the filter (which in the depiction of FIG. 3, will be provided by the point designed 45), to the farthest upstream point of the filter (which in the depiction of FIG. 3 will be the upstream face of upstream flange 30). If filters 1 are to be nestable, and filter media 5 is to be pleated, it may be useful that the filter media of each filter be positioned and aligned so that the peaks and valleys of the pleated media of the stacked filters, are aligned with each other so as to facilitate efficient nesting of the filters.

It has been found that with the designs presented herein, the angle of the sidewalls of the finished filter frame may be largely, or completely, set by the design of the frame portions themselves, rather than having to use special tooling (e.g., with angled tooling faces) to dictate the angle of the frame sidewalls. Such tooling may nevertheless be used if desired. It has further been found that filter frames as disclosed herein, once fully assembled and with e.g. a bonding adhesive fully solidified, are not collapsible. That is, in ordinary handling, packaging and use of the filters, the sidewalls cannot be fully flattened outward into the major plane of the filter media to any significant extent, nor can they be flattened inward into the major plane of the filter media to any significant extent, without causing unacceptable damage to the frames. The term "fully flattened" is used in recognition of the fact that it might be possible, especially in the case of a very long (e.g., 25 inches or more) filter frame portion, to appreciably deform a section of the frame that is toward the center of the elongate length of the frame. However, for purposes of denoting a frame as not collapsible, it will be appreciated that even if some such deformation toward the center of the elongate length of a filter frame portion is possible, it will not be possible in the sections of the filter frame that are proximate (e.g., within a few cm of) the corners.

While the discussions above have focused primarily on the exemplary case of separate frame pieces, e.g. four separate frame pieces, it will be appreciated that the disclosures presented herein are not limited to such cases. Thus, the use of an open-ended offset slot as disclosed herein, encompasses the use of such a feature in the producing of a frame by the assembly of two L-shaped pieces, and in the producing of a frame by the folding of a single integral frame piece. Such a single frame piece might comprise e.g. a continuous picture-frame inner border made of four integrally-connected sections each of which could provide an upstream flange of the finished frame. Extending outwardly in order from each of these sections could be (foldably connected) sections that could respectively form an outer sidewall, an inner sidewall, and a downstream flange (with, e.g., each outer sidewall-forming section not being connected to any other outer-sidewall-forming section, and so on). One or more inner sidewall-forming sections of such a single-piece frame would comprise an open-ended offset slot as disclosed above. Other features disclosed herein (an offset junction between a minor edge of a downstream flange and a minor edge of an inner sidewall, a tab, and so on) could likewise be provided if desired.

Such a single frame piece could be assembled into a finished frame in similar manner to that described above, except of course that no step of initially connecting the upstream flanges to each other would be required in this case. It will however be appreciated that if such a single-piece frame is used, a tab 42 of one outer sidewall, and/or a terminal end 143 of an adjacent outer sidewall, may need to be redesigned from the configuration shown in FIG. 5 (i.e., since the overlap of a portion of tab 42 of a second frame portion 12b with a portion of sidewall 140 of a first frame portion 12a that is shown in FIG. 5, cannot be supplied in this manner if the two frame portions are portions of a single piece of e.g. die-cut paperboard). In some embodiments, frame 12 (whether a single-piece frame or assembled from e.g. two, three or four frame pieces), may comprise a perforated paperboard support that extends between opposing frame portions (thus spanning the filter media area that is bordered by frame 12) and is connected thereto. In other embodiments, no such perforated paperboard support is present.

In summary, it is emphasized that the disclosures herein regarding the use of an open-ended, offset slot, are not limited to the exemplary case of a frame that is formed from four separate frame pieces. It will likewise be understood that other variations are possible. Rather than each of four pieces having an open-ended, offset slot on one end, two pieces could have an open-ended, offset slot on each end, with two other pieces not having such a slot. The same holds true for e.g. offset junctions and tabs. Likewise, although discussions herein have primarily focused on the exemplary case in which frame pieces are initially connected with mechanical fasteners (staples) with the final bonding of the finished frame being accomplished by adhesive, any suitable variation of such approaches may be used. It will be appreciated however that the exemplary designs shown herein, in which each frame piece comprises an open-ended, offset slot at one end, and an offset junction at the other end (and an optional tab if present) may provide advantages in flexibility of manufacturing. (E.g., 20" pieces of such design may be used in e.g. 16"×20" filters, 20"×20" filters, and 20"×25" filters, thus minimizing the need to maintain inventory of multiple frame pieces for different size filters.)

Any suitable air filter media 5 may be used in filter 1. As mentioned, air filter media 5 may conveniently comprise a generally rectangular perimeter 6 which may be shaped and sized to match the shape and size of frame 12. Air filter media 5 is typically sheet-like, with a length and width that are greater than the thickness of the air filter media and with an overall planar configuration (even if pleated). Although FIGS. 1-2 illustrate an air filter 1 comprising non-pleated filter media 5, any suitable filter media, including pleated media, may be used. In some embodiments, filter media 5 may comprise an electret-comprising nonwoven material. In some embodiments, filter media 5 may comprise fiberglass fibers.

In some embodiments, filter media 5 (whether pleated or in substantially flat state or otherwise), may include one or more layers comprising an open cell structures, a porous media, a nonwoven scrims, reinforcing filaments, nettings, wire meshes, or any such structure(s), which may be provided along with the filter media (e.g., bonded thereto) and which may be made of any suitable material. Whether inherently, or by way of a reinforcing layer, it will be advantageous that filter media 5 be sufficiently strong as to survive the air pressure applied in conventional forced-air heating and/or cooling systems. Further advantages may be gained if the media is able to enhance the frame strength e.g. by distributing the air-pressure load over the various portions of the frame.

In some embodiments filter media 5 may comprise a bondable border area 7 that may be e.g. sandwiched between portions of upstream flange 30 and downstream flange 60 of frame 12 and may be attached to one or both flanges (e.g. by adhesive and/or by mechanical fasteners such as staples, as discussed previously herein). Although not shown in FIG. 2, some media may be somewhat compressible, such that the capturing of the media between the flanges and the pressing of the filter frame, may cause the media to be compressed (e.g., as much as 10, 20, 30% or more) from its uncompressed thickness.

List of Exemplary Embodiments

Embodiment 1. A framed air filter, comprising: an air filter media comprising a generally rectangular perimeter with four major edges; and, a frame comprising four frame portions, each frame portion being mounted on one of the four major edges of the filter media and with neighboring frame portions meeting to form corners of the frame, wherein each frame portion comprises an upstream flange and a downstream flange, and an inner sidewall and an outer sidewall, and wherein the inner sidewall of at least a first one of the frame portions comprises an open-ended, offset slot.

Embodiment 2. The framed air filter of embodiment 1 wherein at least a portion of a minor terminal end of a downstream flange of a second frame portion, which second frame portion is a neighboring frame portion to the first frame portion and meets the first frame portion to form a corner of the frame, is at least partially inserted into the open-ended, offset slot in the inner sidewall of the first frame portion.

Embodiment 3. The framed air filter of any of embodiments 1-2 wherein the open-ended, offset slot is provided by a multisegment slit in the inner sidewall of the first frame portion, which multisegment slit comprises a first segment that extends from a minor edge of the inner sidewall of the first frame portion, in a first direction generally parallel to a fold line that foldably connects the inner sidewall of the first frame portion to the downstream flange of the first frame portion, and a second segment that is shorter than the first segment, the second segment extending from the first segment to the fold line along a second direction that is oriented away from the first direction by at least about 50 degrees.

Embodiment 4. The framed air filter of embodiment 3 wherein the multisegment slit is a generally L-shaped slit in which the first segment is at least four times as long as the second segment and in which the second direction, along which the second segment extends, is oriented about 90 degrees from the first direction along which the first segment extends.

Embodiment 5. The framed air filter of any of embodiments 3-4 wherein the fold line that foldably connects the inner sidewall of the first frame portion to the downstream flange of the first frame portion, terminates proximate the second segment of the multisegment slit and does not extend therepast to the minor edge of the inner sidewall.

Embodiment 6. The framed air filter of any of embodiments 3-5 wherein the multisegment slit is a weedless slit.

Embodiment 7. The framed air filter of any of embodiments 1-6 wherein the first frame portion and a second, neighboring frame portion meet to form a corner of the frame, and wherein, at an end of the second frame portion that meets the first frame portion to form a corner, a fold line that foldably connects a downstream flange of the second frame portion to an inner sidewall of the second frame portion, comprises an offset junction between a minor edge of the downstream flange of the second frame portion and a minor edge of the inner sidewall of the second frame portion.

Embodiment 8. The framed air filter of embodiment 7 wherein the minor edge of the inner sidewall of the second frame portion is angled away from the minor edge of the downstream flange at a nominal angle of about 10 to about 25 degrees.

Embodiment 9. The framed air filter of any of embodiments 1-8 wherein the first frame portion and a second, neighboring frame portion meet to form a corner of the frame, and wherein at least one of the frame portions comprises a tab that integrally extends from a minor end of an outer sidewall of that frame portion and is connected thereto by a fold line, and wherein the tab extends into a space between the inner and outer sidewalls of the other frame portion.

Embodiment 10. The framed air filter of embodiment 9 wherein the tab extends from an outer sidewall of the second frame portion, and wherein a minor upstream edge of the tab is oriented at a nominal angle of between about 10-25 degrees away from a fold line that foldably connects an upstream flange of the second frame portion to an outer sidewall of the second frame portion.

Embodiment 11. The framed air filter of any of embodiments 1-10 wherein the first frame portion and a second, neighboring frame portion meet to form a corner of the frame, and wherein at least an upstream end of a minor terminal edge of an inner sidewall of one of the frame portions is outwardly tucked behind a minor terminal edge of an inner sidewall of the other frame portion.

Embodiment 12. The framed air filter of any of embodiments 1-11 wherein the inner sidewall of the first frame portion is oriented at a nominal angle of about 90 degrees to about 140 degrees, from the downstream flange of the first frame portion.

Embodiment 13. The framed air filter of embodiment 12 wherein the frame air filter is nestable.

Embodiment 14. The framed air filter of any of embodiments 1-13 wherein the frame is neither inwardly-collapsible nor outwardly-collapsible.

Embodiment 15. The framed air filter of any of embodiments 1-14 wherein the four frame portions are provided by four individual, separately-made, foldable frame pieces.

Embodiment 16. The framed air filter of embodiment 15 wherein each frame piece comprises a first end, at which a fold line that foldably connects a downstream flange of the frame piece to an inner sidewall of the frame piece, comprises an offset junction between a minor edge of the downstream flange and a minor edge of the inner sidewall, and wherein each frame piece comprises a second end at which the inner sidewall of the frame piece comprises an open-ended, offset slot.

Embodiment 17. The framed air filter of embodiment 16 wherein the first end of each frame piece is configured to be joinable with the second end of any other frame piece, to form a corner of a frame.

Embodiment 18. The framed air filter of any of embodiments 1-17 wherein a width of the downstream flange is about 85-95% of a width of the upstream flange, on average, and wherein a width of the inner sidewall is about 85-95% of a width of the outer sidewall, on average.

Embodiment 19. The framed air filter of any of embodiments 1-18 wherein an inwardmost edge of the downstream flange is aligned within about 1 mm, on average, of an inwardmost edge of the upstream flange.

Embodiment 20. The framed air filter of any of embodiments 1-19 wherein the filter media is unpleated filter media.

Embodiment 21. The framed air filter of any of embodiments 1-20 further comprising an air-permeable support layer that is attached to the frame and that is adjacent the downstream surface of the filter media over at least some of the area of the filter media that is bordered by the frame.

Embodiment 22. The framed air filter of any of embodiments 1-21 wherein at least a portion of an inward-facing surface of the outer sidewall, and at least a portion of an outward-facing surface of the inner sidewall, are adhesively bonded to each other.

Embodiment 23. A method of at least partially assembling at least a portion of a filter frame, comprising: providing a first frame portion with a first upstream flange, first inner sidewall, first outer sidewall and first downstream flange; providing a second, frame portion with a second upstream flange, second inner sidewall, second outer sidewall and second downstream flange; wherein a first end of the first upstream flange is connected to a first end of the second upstream flange; and, inserting a minor terminal end of the second downstream flange into an open-ended, offset slot in the first inner sidewall.

Embodiment 24. The method of embodiment 23 wherein the method includes the step of forming the open-ended, offset slot in the first inner sidewall by folding the first inner sidewall relative to the first downstream flange, along a fold line that foldably connects the first inner sidewall and the first downstream flange, thus causing a tongue to break away from the first inner sidewall along a multisegment slit and to remain generally coplanar with the first downstream flange thus opening up the open-ended, offset slot.

Embodiment 25. The method of any of embodiments 23-24 wherein the inserting of the minor terminal end of the second downstream flange into the open-ended, offset slot in the first inner sidewall causes the first and second frame portions to form a self-stabilizing frame corner.

Embodiment 26. The method of any of embodiments 23-25 wherein the method further includes providing a third frame portion with a third upstream flange, third inner sidewall, third outer sidewall and third downstream flange, and providing a fourth frame portion with a fourth upstream flange, fourth inner sidewall, fourth outer sidewall and fourth downstream flange; and wherein the method further includes the steps of inserting a minor terminal end of the third downstream flange into an open-ended, offset slot in the second inner sidewall, inserting a minor terminal end of the fourth downstream flange into an open-ended, offset slot in the third inner sidewall, and inserting a minor terminal end of the first downstream flange into an open-ended, offset slot in the fourth inner sidewall, so as to form a partially assembled frame with four self-stabilizing corners.

Embodiment 27. The method of any of embodiments 23-26 wherein the method further includes placing a filter media so that borders of first, second, third and fourth major edges of the filter media are between the upstream and downstream flanges of the first, second, third and fourth frame portions, respectively, and pressing the filter frame so as to form a finished, framed filter.

Embodiment 28. The method of embodiment 27 wherein the pressing of the filter frame causes an adhesive to solidify so as to, for each frame portion, bond the upstream and downstream flanges of that frame portion to each other and/or to the border of the filter media.

Embodiment 2. The framed air filter of any of embodiments 1-22, made by the method of any of embodiments 23-28.

EXAMPLES

Framed air filters were made according to the following procedure. Air filter media (unpleated) was obtained from 3M Company, St. Paul, Minn. The media was 20 grams per square meter electrostatically charged polyolefin, reinforced with a polymeric netting (comprising a square pattern of filaments) on both sides. Four frame pieces of the general type depicted in FIG. 4 were obtained. The frame pieces comprised lengths appropriate to produce a nominal 20"×25" filter (there being two long pieces and two short pieces).

Each frame piece comprised an upstream flange that was about 26 mm in width, an outer sidewall that was about 22 mm in width, an inner sidewall that was about 20 mm in width, and a downstream flange that was about 24 mm in width. The frame pieces were die-cut from paperboard (of thickness approximately 0.65 mm) obtained from Carton Craft Company of New Albany, Ind. Fold lines were provided by crush scoring at the junctions of the various flanges and sidewalls, as shown in FIG. 4. A multisegment, weedless slit was provided (by die-cutting) in one end of the inner sidewall in each of the four frame pieces as shown in FIG. 4, with the long segment of the slit being about 28 mm in length and the short segment of the slit being about 2.5 mm in length and extending at a right angle from the end of the long segment of the slit, to the fold line between the inner sidewall and the downstream flange. The fold line terminated at its junction with the short segment of the slit rather than extending therepast toward the (nearest) end of the frame piece. At the other end of each frame piece from the multisegment slit, the minor edge of the inner sidewall met the minor edge of the downstream flange (along the fold line between the inner sidewall and the downstream flange) so as to provide an offset junction as shown in FIG. 4. Specifically, the minor edge of the inner sidewall was angled (at an angle of about 17 degrees away from the minor edge of the downstream flange) so that it met the fold line at a point about 2.5 mm away (inward toward the other end of the frame piece) from the point at which the minor edge of the downstream flange met the fold line, thus providing the offset junction. At the same end of the frame piece as the offset junction was provided a tab that was integrally and foldably connected to the outer sidewall and that projected therefrom a distance of about 22 mm (measured at the centerline of the tab). The tab projected at an angle so that a minor upstream edge of the tab was positioned at an angle of about 15 degrees relative to the fold line connecting the upstream flange and the outer sidewall, as shown in FIG. 4.

The frame pieces were placed into a fixture that served to position each frame piece so that an end of the upstream flange of each frame piece was in overlapping relation with an end of the upstream flange of a neighboring frame piece, generally as shown in FIG. 5. At each corner, the upstream flange of a frame piece end that contained an offset slot was lowermost, with the upstream flange of a frame piece end that did not contain an offset slot being uppermost (e.g., as viewed in FIG. 5). The neighboring frame pieces were connected to each other within the area of overlap with a single staple, with the staple tines penetrating through the pieces from the upstream side, as shown in FIG. 5. A bead of liquid (water based) adhesive (obtained from HB Fuller, St. Paul Minn.) under the trade designation WB8711 AF was applied to the downstream-facing surface of the upstream flange of each frame piece, in quasi-continuous manner. A small amount of the adhesive was also applied to the face of each tab. A suitably sized rectangular piece of the filter media was placed in the fixture, with an approximately 2 cm overlap of the border of the filter media with the upstream flanges of the frame pieces. The adhesive soaked through the filter media so no additional adhesive was needed on the downstream surface of the filter media. The connected frame pieces were then removed from the fixture and each filter frame piece was then folded as described above (with each tab of a frame piece being inserted between the inner and outer sidewalls of its neighboring frame piece during the folding process). Each corner was thus formed into a configuration similar to that shown in FIG. 3, and it was observed that the self-stabilizing qualities of the corners enhanced the ability to handle the partially assembled filter.

The partially assembled filter was placed into a press. The press comprised a rectangular metal frame which was heated to a nominal temperature of approximately 95 degrees C., and which had a generally flat lower surface. The generally flat lower surface of the frame was brought against the stacked flanges of the partially assembled filter frame with the outer edges of the metal frame positioned inwardly adjacent the inner sidewalls of the frame pieces. The frame was pressed in this manner, at a pressure of approximately 94 pounds per linear inch, for approximately one minute. This resulted in solidifying of the adhesive and formation of the finished filter. With the above-described design of the frame parts, the thus-produced filters comprised an angle between the inner sidewall and the downstream flange in the range of approximately 105-110 degrees. The sidewalls could not be collapsed or folded (whether inwardly or outwardly) without causing unacceptable damage to the frame (e.g., without ripping the frame apart at the corners). While in this particular example no adhesive was used on the surfaces of the sidewalls (except for such adhesive which had been placed on the tabs which were captured between the inner and outer sidewall), any gap between the inner and outer sidewalls appeared to be less than about 1 mm in most locations along the frame portions.

Many repetitions and variations on this process were performed (with different size frame pieces, with and without adhesive on the sidewall surfaces, etc.), with results similar to those disclosed above.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification and the disclosure in any document incorporated by reference herein, this specification will control.

What is claimed is:

1. A framed air filter, comprising:
   an air filter media comprising a generally rectangular perimeter with four major edges; and,
   a frame comprising four frame portions, each frame portion being mounted on one of the four major edges of the filter media and with neighboring frame portions meeting to form corners of the frame,
      wherein each frame portion comprises an upstream flange and a downstream flange, and an inner sidewall and an outer sidewall,
      and wherein the inner sidewall of at least a first one of the frame portions comprises an open-ended, offset slot.

2. The framed air filter of claim 1 wherein at least a portion of a minor terminal end of a downstream flange of a second frame portion, which second frame portion is a neighboring frame portion to the first frame portion and meets the first frame portion to form a corner of the frame, is at least partially inserted into the open-ended, offset slot in the inner sidewall of the first frame portion.

3. The framed air filter of claim 1 wherein the open-ended, offset slot is provided by a multisegment slit in the inner sidewall of the first frame portion, which multisegment slit comprises a first segment that extends from a minor edge of the inner sidewall of the first frame portion, in a first direction generally parallel to a fold line that foldably connects the inner sidewall of the first frame portion to the downstream flange of the first frame portion, and a second segment that is shorter than the first segment, the second segment extending from the first segment to the fold line along a second direction that is oriented away from the first direction by at least about 50 degrees.

4. The framed air filter of claim 3 wherein the multisegment slit is a generally L-shaped slit in which the first segment is at least four times as long as the second segment and in which the second direction, along which the second segment extends, is oriented about 90 degrees from the first direction along which the first segment extends.

5. The framed air filter of claim 3 wherein the fold line that foldably connects the inner sidewall of the first frame portion to the downstream flange of the first frame portion, terminates proximate the second segment of the multisegment slit and does not extend therepast to the minor edge of the inner sidewall.

6. The framed air filter of claim 3 wherein the multisegment slit is a weedless slit.

7. The framed air filter of claim 1 wherein the first frame portion and a second, neighboring frame portion meet to form a corner of the frame, and wherein, at an end of the second frame portion that meets the first frame portion to form a corner, a fold line that foldably connects a downstream flange of the second frame portion to an inner sidewall of the second frame portion, comprises an offset junction between a minor edge of the downstream flange of the second frame portion and a minor edge of the inner sidewall of the second frame portion.

8. The framed air filter of claim 1 wherein the first frame portion and a second, neighboring frame portion meet to form a corner of the frame, and wherein at least one of the frame portions comprises a tab that integrally extends from a minor end of an outer sidewall of that frame portion and is connected thereto by a fold line, and wherein the tab extends into a space between the inner and outer sidewalls of the other frame portion.

9. The framed air filter of claim 1 wherein the first frame portion and a second, neighboring frame portion meet to form a corner of the frame, and wherein at least an upstream end of a minor terminal edge of an inner sidewall of one of the frame portions is outwardly tucked behind a minor terminal edge of an inner sidewall of the other frame portion.

10. The framed air filter of claim 1 wherein the inner sidewall of the first frame portion is oriented at a nominal angle of about 90 degrees to about 140 degrees, from the downstream flange of the first frame portion.

11. The framed air filter of claim 10 wherein the frame air filter is nestable.

12. The framed air filter of claim 1 wherein the four frame portions are provided by four individual, separately-made, foldable frame pieces.

13. The framed air filter of claim 12 wherein each frame piece comprises a first end, at which a fold line that foldably connects a downstream flange of the frame piece to an inner sidewall of the frame piece, comprises an offset junction between a minor edge of the downstream flange and a minor edge of the inner sidewall, and wherein each frame piece comprises a second end at which the inner sidewall of the frame piece comprises an open-ended, offset slot.

14. The framed air filter of claim 13 wherein the first end of each frame piece is configured to be joinable with the second end of any other frame piece, to form a corner of a frame.

15. A method of at least partially assembling at least a portion of a filter frame, comprising:
   providing a first frame portion with a first upstream flange, first inner sidewall, first outer sidewall and first downstream flange;
   providing a second, frame portion with a second upstream flange, second inner sidewall, second outer sidewall and second downstream flange;
   wherein a first end of the first upstream flange is connected to a first end of the second upstream flange;
   and, inserting a minor terminal end of the second downstream flange into an open-ended, offset slot in the first inner sidewall.

16. The method of claim 15 wherein the method includes the step of forming the open-ended, offset slot in the first inner sidewall by folding the first inner sidewall relative to the first downstream flange, along a fold line that foldably connects the first inner sidewall and the first downstream flange, thus causing a tongue to break away from the first inner sidewall along a multisegment slit and to remain generally coplanar with the first downstream flange thus opening up the open-ended, offset slot.

17. The method of claim 15 wherein the inserting of the minor terminal end of the second downstream flange into the open-ended, offset slot in the first inner sidewall causes the first and second frame portions to form a self-stabilizing frame corner.

18. The method of claim 15 wherein the method further includes providing a third frame portion with a third upstream flange, third inner sidewall, third outer sidewall and third downstream flange, and providing a fourth frame portion with a fourth upstream flange, fourth inner sidewall, fourth outer sidewall and fourth downstream flange;
   and wherein the method further includes the steps of inserting a minor terminal end of the third downstream flange into an open-ended, offset slot in the second inner sidewall, inserting a minor terminal end of the fourth downstream flange into an open-ended, offset slot in the third inner sidewall, and inserting a minor terminal end of the first downstream flange into an open-ended, offset slot in the fourth inner sidewall, so as to form a partially assembled frame with four self-stabilizing corners.

19. The method of claim 15 wherein the method further includes placing a filter media so that borders of first, second, third and fourth major edges of the filter media are between the upstream and downstream flanges of the first, second, third and fourth frame portions, respectively, and pressing the filter frame so as to form a finished, framed filter.

20. The method of claim 19 wherein the pressing of the filter frame causes an adhesive to solidify so as to, for each frame portion, bond the upstream and downstream flanges of that frame portion to each other and/or to the border of the filter media.

* * * * *

UNITED STATES PATENT AND TRADEMARK OFFICE
CERTIFICATE OF CORRECTION

PATENT NO. : 8,702,829 B2  
APPLICATION NO. : 13/490545  
DATED : April 22, 2014  
INVENTOR(S) : Jonathan Lise et al.

Page 1 of 1

It is certified that error appears in the above-identified patent and that said Letters Patent is hereby corrected as shown below:

In the Specification

<u>Column 4</u>
Line 12, Delete "of the of the" and insert -- of the --, therefor.

<u>Column 15</u>
Line 49 (Approx.), Delete "2." and insert -- 29. --, therefor.

Signed and Sealed this
Thirtieth Day of December, 2014

Michelle K. Lee
*Deputy Director of the United States Patent and Trademark Office*